(12) United States Patent
Yamamoto et al.

(10) Patent No.: US 11,285,933 B2
(45) Date of Patent: Mar. 29, 2022

(54) VEHICLE DRIVE DEVICE

(71) Applicant: JTEKT CORPORATION, Osaka (JP)

(72) Inventors: Toshihiko Yamamoto, Nishio (JP); Tetsuya Yamazaki, Tokai (JP); Wataru Hirata, Ichinomiya (JP); Shotaro Niimi, Kariya (JP); Tomoaki Kato, Kariya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/948,723

(22) Filed: Sep. 30, 2020

(65) Prior Publication Data
US 2021/0107443 A1 Apr. 15, 2021

(30) Foreign Application Priority Data
Oct. 10, 2019 (JP) .............................. JP2019-186802

(51) Int. Cl.
*B60W 10/02* (2006.01)
*F16D 48/06* (2006.01)
(Continued)

(52) U.S. Cl.
CPC ............ *B60W 10/02* (2013.01); *B60W 10/08* (2013.01); *B60W 50/00* (2013.01); *F16D 48/06* (2013.01); *B60K 6/387* (2013.01); *B60K 6/52* (2013.01); *B60K 17/02* (2013.01); *B60K 17/356* (2013.01); *B60W 2520/30* (2013.01); *B60W 2710/027* (2013.01); *B60W 2710/083* (2013.01); *B60W 2720/406* (2013.01); *B60Y 2200/92* (2013.01); *B60Y 2400/424* (2013.01);
(Continued)

(58) Field of Classification Search
CPC ........ B60K 1/00; B60K 17/354; B60K 17/02; B60K 6/387; B60K 6/52; B60K 17/356; B60K 6/48; B60K 2001/001; B60K 2023/043; B60W 20/00; B60W 10/02; B60W 50/00; B60W 10/08; B60W 2520/30; B60W 2720/406; B60W 2710/027; B60W 2710/083; F16D 48/06; F16D 2500/10412; F16D 2500/1045; F16D 2500/1064; F16D 2500/502; B60Y 2200/92; B60Y 2400/424
See application file for complete search history.

(56) References Cited

U.S. PATENT DOCUMENTS 9,657,825 B2 * 5/2017 Ohmura ............... B60K 17/165
9,657,826 B1 * 5/2017 Morgan .................. F16H 48/22
(Continued)

FOREIGN PATENT DOCUMENTS

| DE | 102017219714 A1 * | 5/2019 | ............. B60K 6/485 |
| JP | 2003-063265 A | 3/2003 | |
| JP | 2003-113874 A | 4/2003 | |

*Primary Examiner* — Justin Holmes
(74) *Attorney, Agent, or Firm* — Oblon, McClelland, Maier & Neustadt, L.L.P.

(57) ABSTRACT

A vehicle drive device includes a control device, and the control device controls an electric motor, a first pressing mechanism and a second pressing mechanism such that a relational expression of $T<T_1+T_2$ is satisfied, where T represents a torque that is input to an input rotation member, $T_1$ represents a maximum of a torque that is able to be transmitted by a first multi-disc clutch and $T_2$ represents a maximum of a torque that is able to be transmitted by a second multi-disc clutch.

2 Claims, 4 Drawing Sheets

(51) Int. Cl.
    *B60W 50/00*     (2006.01)
    *B60W 10/08*     (2006.01)
    *B60K 17/02*     (2006.01)
    *B60K 6/387*     (2007.10)
    *B60K 6/52*     (2007.10)
    *B60K 17/356*     (2006.01)

(52) U.S. Cl.
    CPC ................ *F16D 2500/1045* (2013.01); *F16D 2500/1064* (2013.01); *F16D 2500/10412* (2013.01); *F16D 2500/502* (2013.01)

(56) References Cited

U.S. PATENT DOCUMENTS

| | | |
|---|---|---|
| 2003/0037977 A1 | 2/2003 | Tatara et al. |
| 2015/0096814 A1* | 4/2015 | Maeda ................ B62D 11/003 180/6.28 |
| 2019/0309806 A1* | 10/2019 | Oyabu ............... B60K 23/0808 |
| 2019/0389305 A1* | 12/2019 | Shimizu .......... B60W 30/18172 |
| 2020/0108716 A1* | 4/2020 | Iwazaki ................. B60K 17/35 |
| 2020/0317064 A1* | 10/2020 | Lee ........................ F16D 23/12 |

* cited by examiner

VEHICLE DRIVE DEVICE

CROSS-REFERENCE TO RELATED APPLICATION

This application claims priority to Japanese Patent Application No. 2019-186802 filed on Oct. 10, 2019, incorporated herein by reference in its entirety.

BACKGROUND

1. Technical Field

The disclosure relates to a vehicle drive device.

2. Description of Related Art

Conventionally, four-wheel drive vehicles, which can drive front wheels and rear wheels, include four-wheel drive vehicles each of which drives front wheels using an engine and drives rear wheels using an electric motor (see Japanese Patent Application Publication No. 2003-113874 (JP 2003-113874 A) and Japanese Patent Application Publication No. 2003-63265 (JP 2003-63265 A), for example). Such four-wheel drive vehicles do not require a propeller shaft that transmits drive force of the engine from the front wheel side to the rear wheel side, and therefore allow a broader vehicle cabin and a lighter weight, compared to four-wheel drive vehicles configured to distribute drive force of an engine disposed on the front wheel side to the front wheels and the rear wheels, for example.

The four-wheel drive vehicle described in JP 2003-113874 A includes an electric motor, a speed reducer that reduces drive force of the electric motor, and a differential gear that distributes the drive force reduced by the speed reducer, to the right rear wheel and the left rear wheel, as drive devices that drive the rear wheels.

The four-wheel drive vehicle described in JP 2003-63265 A includes an electric motor, a first clutch interposed between the electric motor and the left rear wheel, and a second clutch interposed between the electric motor and the right rear wheel, as drive devices that drive the rear wheels. Each of the first clutch and the second clutch is a wet multi-disc clutch including multiple clutch plates, and generates friction force while being pressed by an actuator including a linear solenoid valve and the like.

SUMMARY

The four-wheel drive vehicle described in JP 2003-113874 A cannot control the ratio between the drive force to be distributed to the left rear wheel and the drive force to be distributed to the right rear wheel. On the other hand, the four-wheel drive vehicle described in JP 2003-63265 A can control the drive force to be distributed to the left rear wheel and the drive force to be distributed to the right rear wheel, by increasing or decreasing pressing force for the first clutch and pressing force for the second clutch. However, in the case where the speed of slipping between clutch plates is high or in the case where the transmission torque during the slipping between clutch plates is large, durability is impaired by abrasion of surfaces of the clutch plates.

Hence, the disclosure provides a vehicle drive device that includes an electric motor as a drive source, that includes first and second output rotation members, that has a first multi-disc clutch disposed between the electric motor and the first output rotation member, that has a second multi-disc clutch disposed between the electric motor and the second output rotation member, and that can restrain the abrasion of the first and second multi-disc clutches.

An aspect according to a vehicle drive device in the disclosure is a vehicle drive device including an electric motor, a drive force distribution device configured to distribute and output drive force that is input, and a control device configured to control the electric motor and the drive force distribution device, in which: the drive force distribution device includes an input rotation member configured to receive drive force of the electric motor, a first output rotation member and a second output rotation member that are able to relatively rotate coaxially with the input rotation member, a first multi-disc clutch disposed between the input rotation member and the first output rotation member, a second multi-disc clutch disposed between the input rotation member and the second output rotation member, a first pressing mechanism configured to press the first multi-disc clutch, and a second pressing mechanism configured to press the second multi-disc clutch; and the control device controls the electric motor, the first pressing mechanism and the second pressing mechanism such that Expression 1 is satisfied, $$T < T_1 + T_2 \qquad \text{Expression 1}$$

where T represents a torque that is input to the input rotation member, $T_1$ represents a maximum of a torque that is able to be transmitted by the first multi-disc clutch, and $T_2$ represents a maximum of a torque that is able to be transmitted by the second multi-disc clutch.

With the disclosure, it is possible to restrain the abrasion of the multi-disc clutches.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

An embodiment of the disclosure will be described with reference to FIG. 1 to FIG. 4. The embodiment described below shows a specific example that is preferred for carrying out the disclosure, and specifically shows various preferred technical matters as examples. However, the technical scope of the disclosure is not limited to the specific mode.

Configuration of Four-Wheel Drive Vehicle

Figure 1:
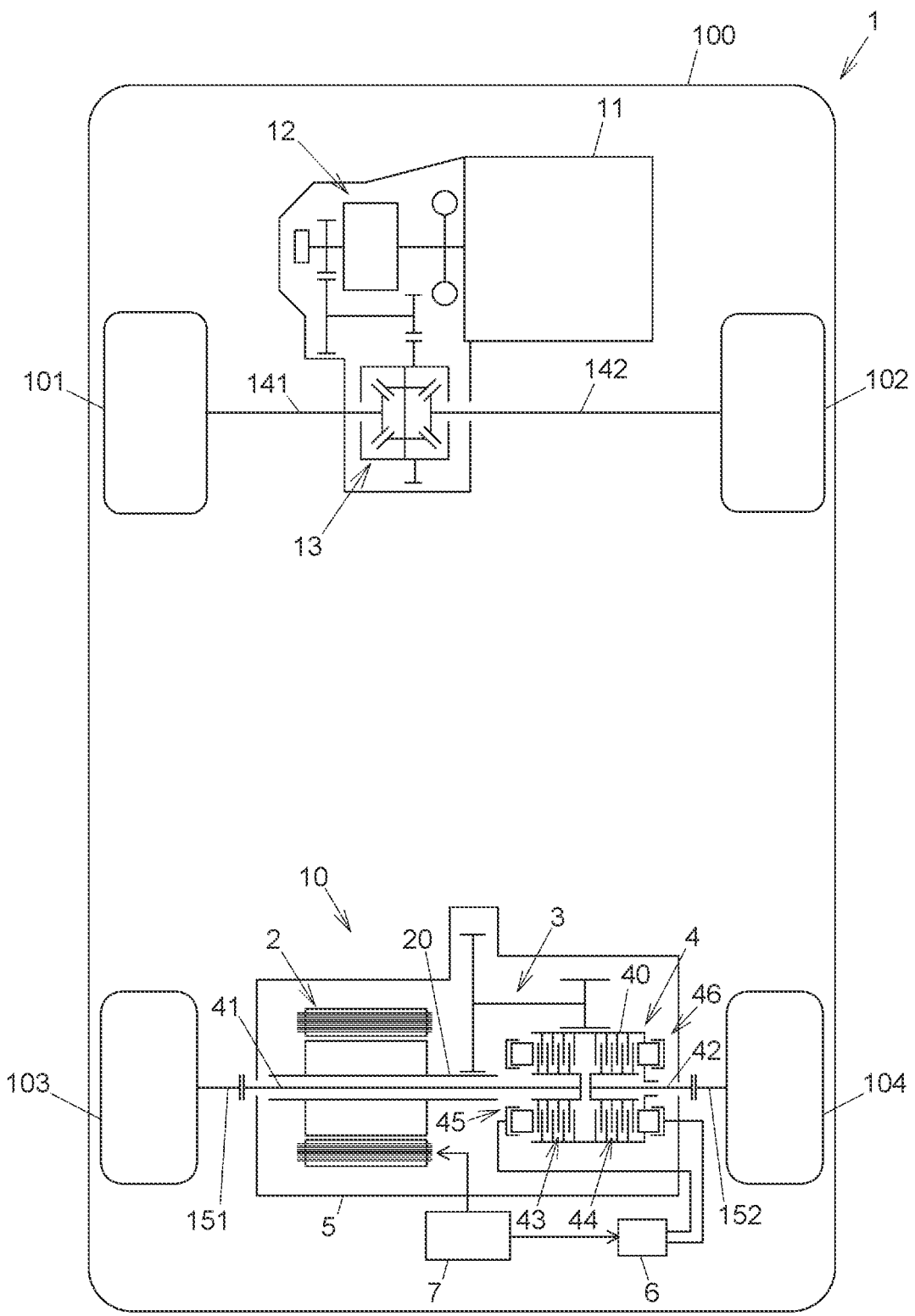
FIG. 1 is a schematic diagram showing an exemplary schematic configuration of a four-wheel drive vehicle equipped with a drive force distribution device according to an embodiment of the disclosure.

FIG. 1 is a schematic diagram showing an exemplary configuration of a four-wheel drive vehicle equipped with a drive device according to the embodiment of the disclosure. In a four-wheel drive vehicle 1 according to the embodiment, left and right front wheels 101, 102 as main drive wheels are driven by drive force of an engine 11 as a main drive source, and left and right rear wheels 103, 104 as auxiliary drive wheels are driven by a drive device 10 including an electric motor 2 as an auxiliary drive source.

The drive force of the engine 11 is transmitted from a transmission 12 to a differential gear 13, and is distributed from the differential gear 13 to the left and right front wheels 101, 102 through left and right drive shafts 141, 142. The drive force is transmitted from the drive device 10 to the left and right rear wheels 103, 104 through left and right drive shafts 151, 152. As the main drive source, a high-power electric motor may be used, and a so-called hybrid drive source in which an engine and a high-power electric motor are combined may be used.

The drive device 10 includes the electric motor 2, a speed reducer 3 that reduces the rotation speed of an output shaft 20 of the electric motor 2, a drive force distribution device 4 that distributes and outputs drive force input from the electric motor 2 through the speed reducer 3, a housing 5 that contains the electric motor 2, the speed reducer 3 and the drive force distribution device 4, a hydraulic power unit 6 that supplies hydraulic oil to the drive force distribution device 4, and a control device 7 that controls the electric motor 2 and the hydraulic power unit 6. If the electric motor 2 can generate a sufficient torque for driving the left and right rear wheels 103, 104, the speed reducer 3 may be excluded. In this case, the drive force of the electric motor 2 is directly input to the drive force distribution device 4.

Configuration of Drive Device

Figure 2:
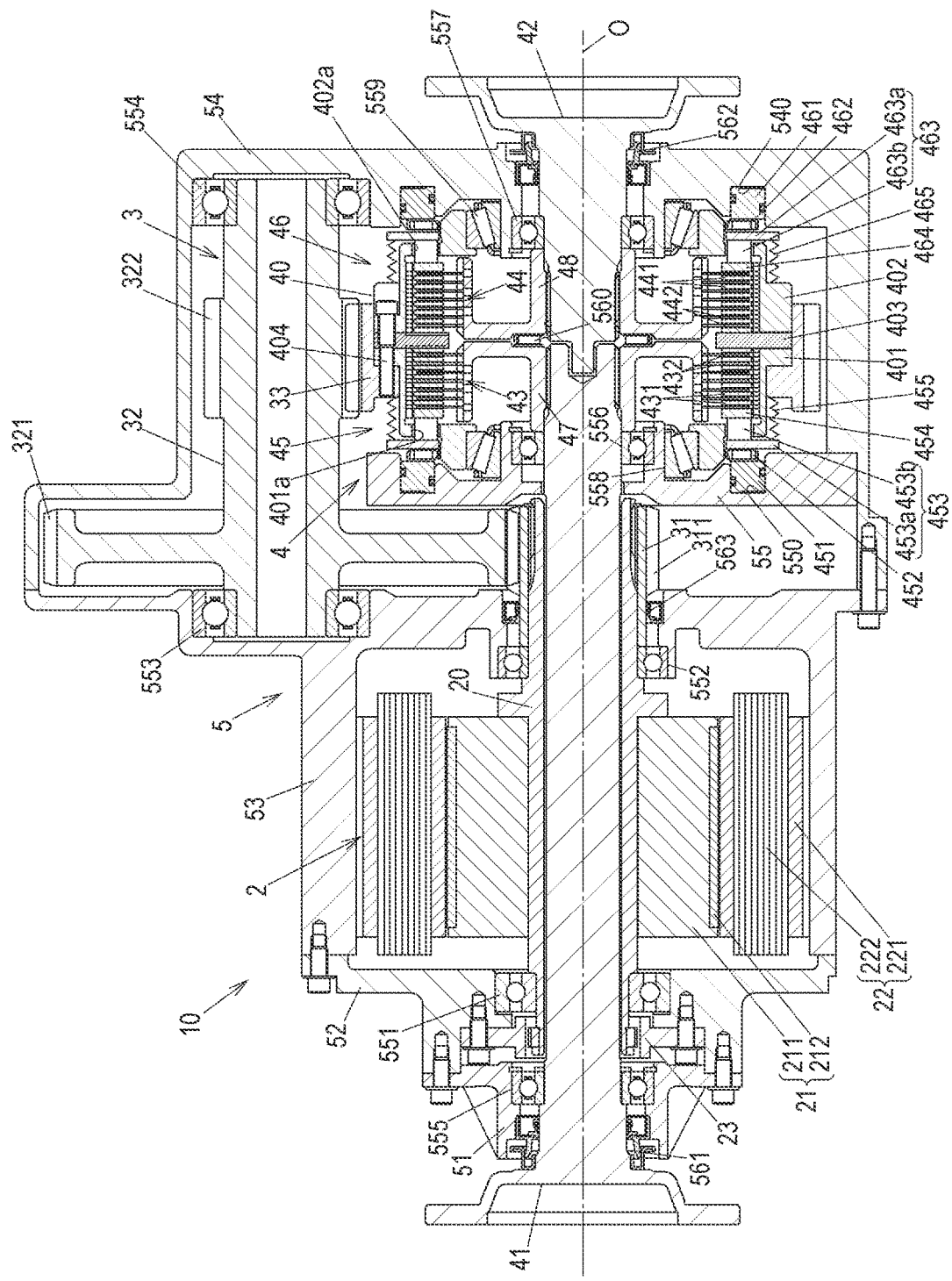
FIG. 2 is a sectional view showing an exemplary configuration of a drive device.

FIG. 2 is a sectional view showing an exemplary configuration of the drive device 10. In FIG. 2, the left side in the figure corresponds to the vehicle left side in the four-wheel drive vehicle 1, and the right side in the figure corresponds to the vehicle right side in the four-wheel drive vehicle 1. The housing 5 includes first to fifth housing members 51 to 55, and the housing members 51 to 55 are fixed to each other by a plurality of bolts.

The electric motor 2 includes the output shaft 20 that has a hollow pipe shape, a rotor 21 that rotates integrally with the output shaft 20, a stator 22 that is disposed around the rotor 21, and a rotation sensor 23 that detects rotation of the output shaft 20. The rotor 21 includes a rotor core 211 and a plurality of permanent magnets 212 that is fixed to the rotor core 211. The stator 22 includes a stator core 221 and winding wires 222 in a plurality of phases that are wound on the stator core 221. A first output rotation member 41 of the drive force distribution device 4 is inserted into the output shaft 20. Motor current is supplied from the control device 7 to the winding wires 222 in the plurality of phases, and the rotor 21 rotates with respect to the stator 22 at a torque depending on the magnitude of the motor current. The control device 7 controls the electric motor 2 by increasing or decreasing the electric current that is supplied to the winding wires 222 in the plurality of phases.

The speed reducer 3 is configured to include a cylindrical pinion gear 31 that is fixed around an end portion of the output shaft 20 of the electric motor 2, a reduction gear 32 that has a large-diameter gear portion 321 and a small-diameter gear portion 322, and a ring gear 33 that engages with the small-diameter gear portion 322. The pinion gear 31 is fitted to the output shaft 20 by spline, and rotates integrally with the output shaft 20. A gear portion 311 formed on the outer circumference engages with the large-diameter gear portion 321 of the reduction gear 32. The drive force of the electric motor 2 is input from the ring gear 33 to an input rotation member 40 of the drive force distribution device 4.

The drive force distribution device 4 includes the input rotation member 40 that receives the drive force of the electric motor 2, first and second output rotation members 41, 42 that are able to relatively rotate coaxially with the input rotation member 40, a first multi-disc clutch 43 that is disposed between the input rotation member 40 and the first output rotation member 41, a second multi-disc clutch 44 that is disposed between the input rotation member 40 and the second output rotation member 42, a first pressing mechanism 45 that presses the first multi-disc clutch 43, and a second pressing mechanism 46 that presses the second multi-disc clutch 44.

In the embodiment, a first clutch hub 47 is disposed so as to be interposed between the first multi-disc clutch 43 and the first output rotation member 41, and a second clutch hub 48 is disposed so as to be interposed between the second multi-disc clutch 44 and the second output rotation member 42. The first output rotation member 41 is fitted to the first clutch hub 47 by spline, and rotates integrally with the first clutch hub 47. The second output rotation member 42 is fitted to the second clutch hub 48 by spline, and rotates integrally with the second clutch hub 48.

The input rotation member 40, the first output rotation member 41 and the second output rotation member 42 can rotate around a rotation axis O relative to each other. Each of the first multi-disc clutch 43 and the second multi-disc clutch 44 is a wet multi-disc clutch in which friction sliding is lubricated by lubricant. In the drive device 10, rolling bearings 551 to 560 that smooth the rotation of each parts, and seal members 561 to 563 that prevent leakage of the lubricant and invasion of foreign matters are disposed at appropriate places. Hereinafter, a direction parallel to the rotation axis O is referred to as an axial direction.

The input rotation member 40 includes a first clutch drum 401 that is disposed on the outer circumference of the first clutch hub 47, a second clutch drum 402 that is disposed on the outer circumference of the second clutch hub 48, a center plate 403 that is disposed between the first clutch drum 401 and the second clutch drum 402, and a plurality of bolts 404. The bolts 404 connect the first clutch drum 401, the second clutch drum 402 and the center plate 403, such that relative rotation cannot be performed, and fix the first clutch drum 401, the second clutch drum 402 and the center plate 403 to the ring gear 33. In FIG. 2, one bolt 404 of the bolts 404 is illustrated.

The first multi-disc clutch 43 includes a plurality of first input clutch plates 431 that rotates together with the first clutch drum 401, and a plurality of first output clutch plates 432 that rotates together with the first clutch hub 47. The first input clutch plates 431 and the first output clutch plates 432 are alternately disposed along the axial direction. The first input clutch plates 431 engage with the first clutch drum 401 by spline, and can move in the axial direction but cannot rotate relative to the first clutch drum 401. The first output clutch plates 432 engage with the first clutch hub 47 by spline, and can move in the axial direction but cannot rotate relative to the first clutch hub 47.

The second multi-disc clutch 44 includes a plurality of second input clutch plates 441 that rotates together with the second clutch drum 402, and a plurality of second output clutch plates 442 that rotates together with the second clutch hub 48. The second input clutch plates 441 and the second output clutch plates 442 are alternately disposed along the axial direction. The second input clutch plates 441 engage with the second clutch drum 402 by spline, and can move in the axial direction but cannot rotate relative to the second clutch drum 402. The second output clutch plates 442 engage with the second clutch hub 48 by spline, and can rotate in the axial direction but cannot rotate relative to the second clutch hub 48.

The first pressing mechanism 45 includes a ring-shaped piston 451 that receives the hydraulic pressure supplied from the hydraulic power unit 6, a thrust roller bearing 452 that is disposed so as to be arrayed in the axial direction along with the piston 451, a pressing member 453 that receives the pressing force of the piston 451 through the thrust roller bearing 452, a pressing plate 454 that is disposed on the inside of the first clutch drum 401, and a return spring 455 that abuts on the pressing member 453.

The piston 451 is contained in a circular cylinder 550 that is formed in the fifth housing member 55, and moves toward the first multi-disc clutch 43 in the axial direction by the pressure of the hydraulic oil that is supplied from the hydraulic power unit 6 to the cylinder 550. The pressing member 453 integrally includes a circular portion 453a that has an annular shape, and a plurality of columnar pressing protrusions 453b that protrudes from the circular portion 453a toward the first multi-disc clutch 43 in the axial direction. The pressing protrusions 453b each are inserted into a through-hole 401a that is formed on the first clutch drum 401, and distal portions of the pressing protrusions 453b abut on the pressing plate 454. The return spring 455 abuts on the circular portion 453a, and biases the pressing member 453 to the side of the fifth housing member 55.

The second pressing mechanism 46 includes a ring-shaped piston 461 that receives the hydraulic pressure supplied from the hydraulic power unit 6, a thrust roller bearing 462 that is disposed so as to be arrayed in the axial direction along with the piston 461, a pressing member 463 that receives the pressing force of the piston 461 through the thrust roller bearing 462, a pressing plate 464 that is disposed on the inside of the second clutch drum 402, and a return spring 465 that abuts on the pressing member 463.

The piston 461 is contained in a circular cylinder 540 that is formed in the fourth housing member 54, and moves toward the second multi-disc clutch 44 in the axial direction by the pressure of the hydraulic oil that is supplied from the hydraulic power unit 6 to the cylinder 540. The pressing member 463 integrally includes a circular portion 463a that has an annular shape, and a plurality of columnar pressing protrusions 463b that protrudes from the circular portion 463a toward the second multi-disc clutch 44 in the axial direction. The pressing protrusions 463b each are inserted into a through-hole 402a that is formed on the second clutch drum 402, and distal portions of the pressing protrusions 463b abut on the pressing plate 464. The return spring 465 abuts on the circular portion 463a, and biases the pressing member 463 to the side of the fourth housing member 54.

Configuration of Hydraulic Power Unit

Figure 3:
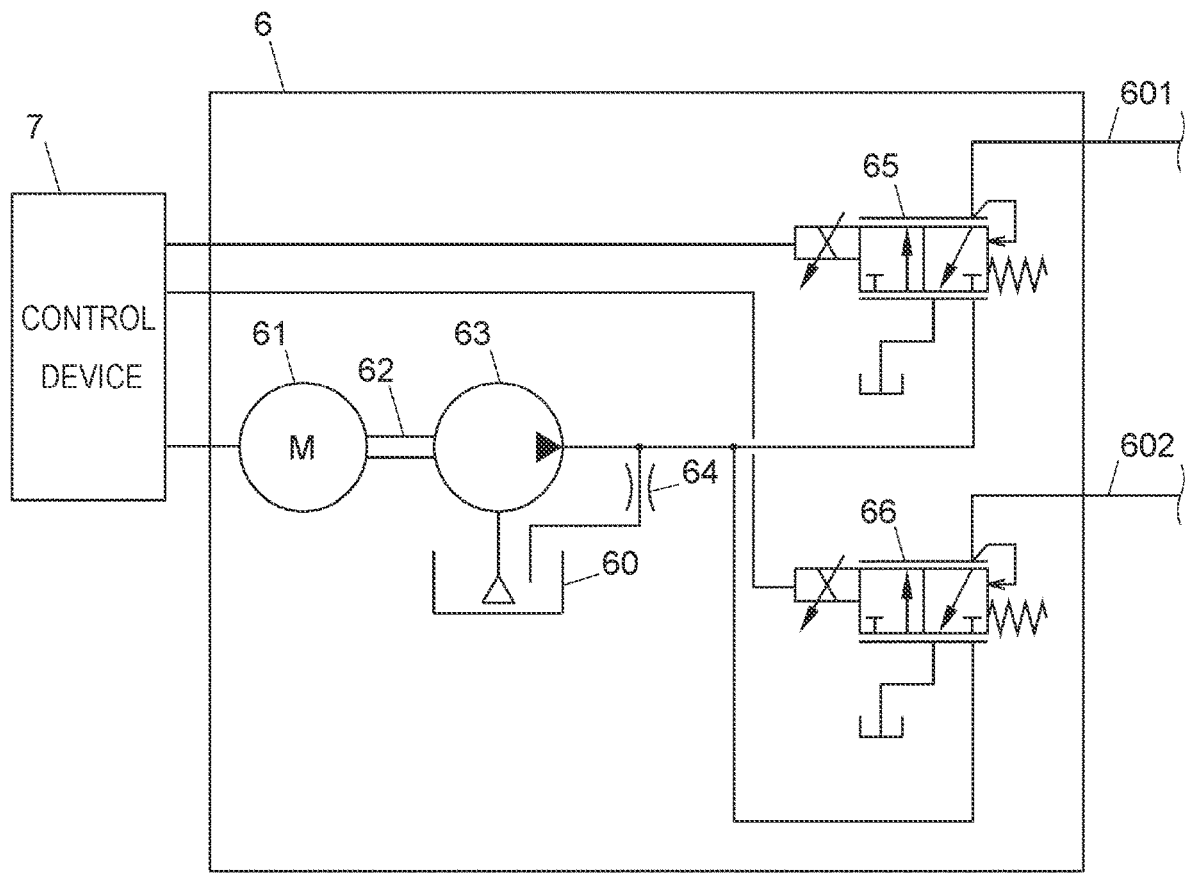
FIG. 3 is a configuration diagram schematically showing an exemplary configuration of a hydraulic power unit.

FIG. 3 is a configuration diagram schematically showing an exemplary configuration of the hydraulic power unit 6. The hydraulic power unit 6 includes a pump motor 61 that generates the torque depending on the electric current supplied from the control device 7, a hydraulic pump 63 that is connected to the pump motor 61 by a connecting shaft 62, a relief valve 64, and first and second control valves 65, 66. The hydraulic pump 63, which is driven by the pump motor 61, pumps up the hydraulic oil from a reservoir 60 and discharges the hydraulic oil. The relief valve 64 is a fixed throttle valve that causes some of the discharged hydraulic oil to flow back to the reservoir 60.

The first control valve 65 is disposed on a pathway that leads to the cylinder 550 from the hydraulic pump 63 through a first oil passage 601. The second control valve 66 is disposed on a pathway that leads to the cylinder 540 from the hydraulic pump 63 through a second oil passage 602. The first and second control valves 65, 66 are pressure control valves for adjusting the pressures of the hydraulic oil that is supplied to the cylinders 550, 540, and the opening degrees of the first and second control valves 65, 66 change depending on the electric current that is supplied from the control device 7.

When the hydraulic oil is supplied from the first oil passage 601 to the cylinder 550, the first pressing mechanism 45 presses the first multi-disc clutch 43 toward the center plate 403, at a pressing force depending on the pressure of the hydraulic oil. The maximum of the torque that is able to be transmitted from the input rotation member 40 to the first output rotation member 41 by the first multi-disc clutch 43 changes depending on the pressing force of the first pressing mechanism 45.

Further, when the hydraulic oil is supplied from the second oil passage 602 to the cylinder 540, the second pressing mechanism 46 presses the second multi-disc clutch 44 toward the center plate 403, at a pressing force depending on the pressure of the hydraulic oil. The maximum of the torque that is able to be transmitted from the input rotation member 40 to the second output rotation member 42 by the second multi-disc clutch 44 changes depending on the pressing force of the second pressing mechanism 46.

By increasing or decreasing the electric current that is supplied to the pump motor 61, the first control valve 65 and the second control valve 66, the control device 7 can control the first pressing mechanism 45 and the second pressing mechanism 46, and can adjust the pressing force that acts on the first multi-disc clutch 43 and the pressing force that acts on the second multi-disc clutch 44.

Control Process by Control Device

Next, a control process that is executed by the control device 7 will be described. Herein, variables T, $T_1$, $T_2$, Ta, Tb, $R_1$ and $R_2$ that are used in the control process are defied as follows.

T: the torque that is input to the input rotation member 40

$T_1$: the maximum of the torque that is able to be transmitted by the first multi-disc clutch 43

$T_2$: the maximum of the torque that is able to be transmitted by the second multi-disc clutch 44

Ta: the torque (first command output torque) that is needed to be output from the first output rotation member 41

Tb: the torque (second command output torque) that is needed to be output from the second output rotation member 42

$R_1$: the rotation speed of the first output rotation member 41

$R_2$: the rotation speed of the second output rotation member 42

The torque T that is input to the input rotation member 40 is a torque resulting from multiplying the torque that is generated by the electric motor 2, by the reduction ratio of the speed reducer 3. The reduction ratio can be obtained as the number of rotations of the output shaft 20 of the electric motor 2 that is necessary for one rotation of the ring gear 33.

The maximum $T_1$ of the torque that is able to be transmitted by the first multi-disc clutch 43 is the maximum of the torque that is able to be transmitted from the input rotation member 40 to the first output rotation member 41 by the first multi-disc clutch 43. That is, if a torque larger than the maximum Ti attempts to be transmitted from the input rotation member 40 to the first output rotation member 41, slipping occurs between the first input clutch plates 431 and the first output clutch plates 432. In other words, the maximum $T_1$ is the maximum of the torque that is able to be transmitted by the friction force between the first input clutch plates 431 and the first output clutch plates 432.

The maximum $T_2$ of the torque that is able to be transmitted by the second multi-disc clutch 44 is the maximum of the torque that is able to be transmitted from the input rotation member 40 to the second output rotation member 42 by the second multi-disc clutch 44. That is, if a torque larger than the maximum $T_2$ attempts to be transmitted from the input rotation member 40 to the second output rotation member 42, slipping occurs between the second input clutch plates 441 and the second output clutch plates 442. In other words, the maximum $T_2$ is the maximum of the torque that is able to be transmitted by the friction force between the second input clutch plates 441 and the second output clutch plates 442.

The first command output torque Ta that is the torque needed to be output from the first output rotation member 41 and the second command output torque Tb that is the torque needed to be output from the second output rotation member 42 are target values of the transmission torque that are computed by the control device 7. The control device 7 computes Ta, Tb based on vehicle information, such that the four-wheel drive vehicle 1 stably travels. For example, the vehicle information includes rotation speed of the front wheels 101, 102 and the rear wheels 103, 104, vehicle speed, steering angle of a steering wheel, accelerator operation amount, yaw rate, an estimated value of road friction coefficient, and the like. The control device 7 can acquire the vehicle information, through an in-vehicle communication network such as controller area network (CAN), for example.

For example, when the accelerator operation amount is large or when the road friction coefficient is low, the control device 7 increases Ta and Tb. Further, at the time of turning, the control device 7 distributes a larger torque to a wheel that is of the left and right rear wheels 103, 104 and that is on the outer side in the turning radius direction. That is, Ta is larger than Tb at the time of right turning, and Tb is larger than Ta at the time of left turning.

The rotation speed $R_1$ of the first output rotation member 41 can be obtained, for example, based on the rotation speed of the left rear wheel 103 that is included in the vehicle information. The rotation speed $R_2$ of the second output rotation member 42 can be obtained, for example, based on the rotation speed of the right rear wheel 104 that is included in the vehicle information. Rotation speed sensors for detecting the rotation speeds of the first and second output rotation members 41, 42 may be provided in the housing 5, and $R_1$ and $R_2$ may be acquired based on detection values of the rotation speed sensors.

In the embodiment, in order to avoid the slipping between clutch plates in at least one of the first multi-disc clutch 43 and the second multi-disc clutch 44, the control device 7 controls the electric motor 2 and the first and second pressing mechanisms 45, 46 such that Expression (1) is satisfied.

$$T<T_1+T_2 \qquad (1)$$

More specifically, the control device 7 computes Ta and Tb based on the vehicle information, controls the electric motor 2 such that the torque T that is input to the input rotation member 40 satisfies Expression (2), controls the first pressing mechanism 45 such that Expression (3) is satisfied, when Ta is larger than Tb, and controls the second pressing mechanism 46 such that Expression (4) is satisfied, when Tb is larger than Ta.

$$T=Ta+Tb \qquad (2)$$

$$T_1>Ta \qquad (3)$$

$$T_2>Tb \qquad (4)$$

By such a control, Expression (1) is satisfied, and even when Ta and Tb are different from each other, one output rotation member that is of the first and second output rotation members 41, 42 and to which a larger torque is transmitted by the first multi-disc clutch 43 or the second multi-disc clutch 44 rotates at the same speed as that of the input rotation member 40, so that the slipping does not occur in the first multi-disc clutch 43 or the second multi-disc clutch 44 disposed between the input rotation member 40 and the one output rotation member. Further, the first and second pressing mechanisms 45, 46 are controlled such that the torque computed based on the vehicle information is transmitted to the other output rotation member, and therefore the residual torque (>T/2) of the torque T input to the input rotation member 40 is transmitted to the one output rotation member.

That is, generally, in the transmission of the torque from the input rotation member to the output rotation member through the multi-disc clutch, when the magnitude of the torque of the input rotation member is smaller than the maximum of the torque that is able to be transmitted by the multi-disc clutch, the torque of the input rotation member is transmitted to the output rotation member with no change, and the slipping does not occur in the multi-disc clutch. Further, when the magnitude of the torque of the input rotation member is larger than the magnitude of the torque that is able to be transmitted by the multi-disc clutch, only the torque that is able to be transmitted by the multi-disc clutch is transmitted to the output rotation member, and the slipping occurs in the multi-disc clutch. In the embodiment, the torque is transmitted from the input rotation member 40 to the first output rotation member 41 through the first multi-disc clutch 43, and the torque is transmitted from the input rotation member 40 to the second output rotation member 42 through the second multi-disc clutch 44. Therefore, for example, in the case where Ta is larger than Tb, the second pressing mechanism 46 is controlled such that the torque Tb is transmitted to the second output rotation member 42 by the second multi-disc clutch 44, and the first pressing mechanism 45 is controlled such that the slipping does not occur in the first multi-disc clutch 43. Thereby, the torque Tb of the torque T input to the input rotation member 40 is transmitted to the second output rotation member 42, and the residual torque resulting from subtracting Tb from T is transmitted to the first output rotation member 41. Since T=Ta+Tb shown in Expression (2) is satisfied, the torque Ta is transmitted to the first output rotation member 41. In the case where Ta and Tb are equal to each other, the first pressing mechanism 45 and the second output rotation member 42 are controlled such that the slipping occurs in neither the first multi-disc clutch 43 nor the second multi-disc clutch 44.

Further, for example, at the time of turning travel, the control device 7 controls the electric motor 2 and the first and second pressing mechanisms 45, 46 such that Expression (5), Expression (6) and Expression (7) are satisfied, when the rotation speed of the first output rotation member 41 is lower than the rotation speed of the second output rotation member 42 ($R_1<R_2$), and controls the electric motor 2 and the first and second pressing mechanisms 45, 46 such that Expression (5), Expression (8) and Expression (9) are satisfied, when the rotation speed of the second output rotation member 42 is lower than the rotation speed of the first output rotation member 41 ($R_1 > R_2$).

$$T = Ta + Tb \quad (5)$$

$$T_1 = Ta \quad (6)$$

$$T_2 > Tb \quad (7)$$

$$T_2 = Tb \quad (8)$$

$$T_1 > Ta \quad (9)$$

Furthermore, at the time of straight travel of the four-wheel drive vehicle 1, the control device 7 controls the electric motor 2 and the first and second pressing mechanisms 45, 46 such that Expression (10) to Expression (12) are satisfied, in the case where the rotation speed of the first output rotation member 41 and the rotation speed of the second output rotation member 42 are set to an identical rotation speed or are kept at an identical rotation speed. The "case where the rotation speed of the first output rotation member 41 and the rotation speed of the second output rotation member 42 are set to an identical rotation speed" means that the difference between the rotation speed of the first output rotation member 41 and the rotation speed of the second output rotation member 42 is being changed from a state where there is a difference to a state where there is no difference. The "case where the rotation speed of the first output rotation member 41 and the rotation speed of the second output rotation member 42 are kept at an identical rotation speed" means that the state where there is no difference between the rotation speed of the first output rotation member 41 and the rotation speed of the second output rotation member 42 is kept, even when there is a difference between rotation resistances of the left and right rear wheels 103, 104, for example. Thereby, it is possible to enhance the straight travel stability of the four-wheel drive vehicle 1.

$$T = Ta + Tb \quad (10)$$

$$T_1 > Ta \quad (11)$$

$$T_2 > Tb \quad (12)$$

Next, a specific example of the process that is executed by the control device 7 will be described based on a flowchart in FIG. 4. The control device 7 repeatedly executes a process shown in the flowchart, in a predetermined control cycle.

Figure 4:
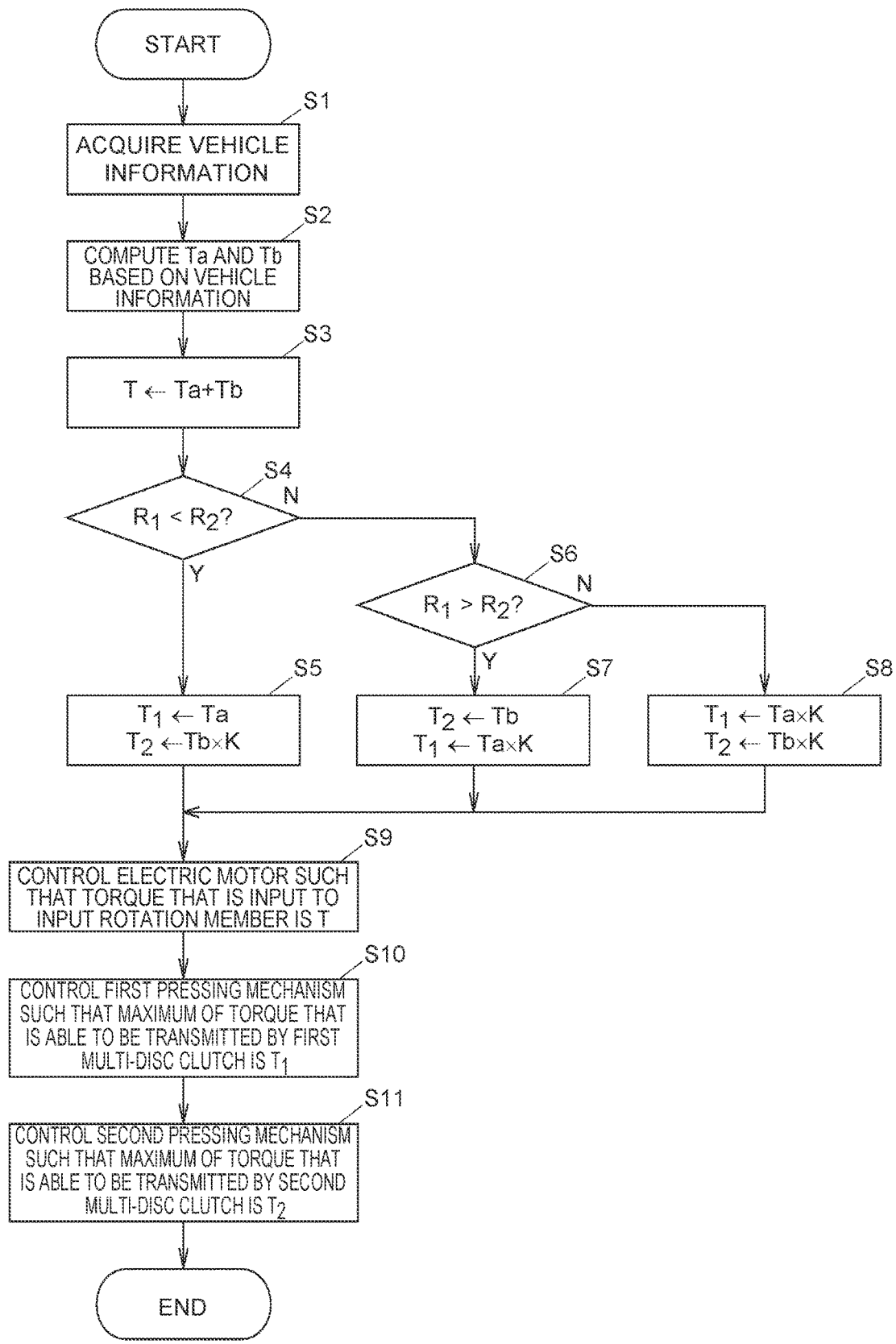
FIG. 4 is a flowchart showing a specific example of a process that is executed by a control device.

In a sequence of processes shown in FIG. 4, first, the control device 7 acquires a variety of vehicle information through the in-vehicle communication network such as CAN (step S1). Next, the control device 7 computes the first command output torque Ta and the second command output torque Tb based on the acquired vehicle information (step S2), and obtains T from the sum (Ta+Tb) of Ta and Tb (step S3).

When the rotation speed of the first output rotation member 41 is lower than the rotation speed of the second output rotation member 42 (step S4: Yes), the control device 7 sets $T_1$ to Ta, and sets $T_2$ to a value resulting from multiplying Tb by a coefficient K larger than 1 (step S5). The coefficient K has a value of 1.1 to 1.2, for example. Further, when the rotation speed of the second output rotation member 42 is lower than the rotation speed of the first output rotation member 41 (step S6: Yes), the control device 7 sets $T_2$ to Tb, and sets $T_1$ to a value resulting from multiplying Ta by the coefficient K (step S7). Furthermore, when the rotation speed of the first output rotation member 41 is equal to the rotation speed of the second output rotation member 42 (step S4: No and step S6: No), the control device 7 sets $T_1$ to the value resulting from multiplying Ta by the coefficient K, and sets $T_2$ to the value resulting from multiplying Tb by the coefficient K (step S8).

Next, the control device 7 controls the electric motor 2 such that the torque that is input to the input rotation member 40 is the torque T obtained in step S3 (step S9). In other words, the control device 7 controls the electric motor 2 such that a torque having a value resulting from dividing T by the reduction ratio of the speed reducer 3 is generated. Further, the control device 7 controls the first pressing mechanism 45 such that the maximum of the torque that is able to be transmitted by the first multi-disc clutch 43 is $T_1$ (step S10), and controls the second pressing mechanism 46 such that the maximum of the torque that is able to be transmitted by the second multi-disc clutch 44 is $T_2$ (step S11).

In the description of the embodiment, in the computations in steps S5, S7 and S8, the multiplication by the coefficient K is performed such that the relation of $T < T_1 + T_2$ is satisfied. However, the coefficient K does not need to be constant in the steps, and the coefficient K may vary in a range larger than 1, for example, depending on the rotation speed of the electric motor 2. Further, $T_1$ and $T_2$ may be obtained by addition of a predetermined positive value, instead of the multiplication by the coefficient K.

Operation and Effect of Embodiment

With the above-described embodiment of the disclosure, it is possible to avoid the slipping between clutch plates in at least one of the first multi-disc clutch 43 and the second multi-disc clutch 44. Therefore, it is possible to restrain the abrasion of the first input clutch plates 431 and first output clutch plates 432 of the first multi-disc clutch 43 and the second input clutch plates 441 and second output clutch plates 442 of the second multi-disc clutch 44, and it is possible to enhance the durability of the drive device 10.

Supplement

The disclosure has been described above based on the embodiment. The disclosure according to the claims is not limited to the embodiment. Note that all combinations of the characteristics described in the embodiment are not essential for means for solving the problem of the disclosure.

The disclosure can be carried out while being appropriately modified without departing from the spirit of the disclosure. For example, in the above-described embodiment, the front wheels 101, 102 are driven by the engine, and the rear wheels 103, 104 are driven by the drive device 10. However, the configuration of the vehicle is not limited to this configuration, and the drive device 10 according to the disclosure can be applied to vehicles having various configurations.

Further, the first output clutch plates 432 may engage with the first output rotation member 41 by spline, without the first clutch hub 47, and the second output clutch plates 442 may engage with the second output rotation member 42 by spline, without the second clutch hub 48.

What is claimed is:

1. A vehicle drive device comprising:
   an electric motor;
   a drive force distribution device configured to distribute and output drive force that is input; and
   a control device configured to control the electric motor and the drive force distribution device, wherein:
   the drive force distribution device includes
      an input rotation member configured to receive drive force of the electric motor, a first output rotation member and a second output rotation member that are able to relatively rotate coaxially with the input rotation member,
a first multi-disc clutch disposed between the input rotation member and the first output rotation member,
a second multi-disc clutch disposed between the input rotation member and the second output rotation member,
a first pressing mechanism configured to press the first multi-disc clutch, and
a second pressing mechanism configured to press the second multi-disc clutch,
the control device controls is configured to
acquire vehicle information,
compute a first command output torque needed to be output from the first output rotation member and a second command output torque needed to be output from the second output rotation member, based on the vehicle information,
compare a first rotation speed of the first output rotation member to a second rotation speed of the second output rotation member,
control the electric motor such that a torque that is input to the input rotation member is equal to a sum of the first command output torque and the second command output torque,
control the first pressing mechanism such that a first maximum of a torque that is able to be transmitted by the first multi-disc clutch is equal to the first command output torque when the first rotation speed is less than the second rotation speed, and the first maximum of the torque that is able to be transmitted by the first multi-disc clutch is greater than the first command output torque when the first rotation speed is greater than the second rotation speed, and
control the second pressing mechanism such that such that a second maximum of a torque that is able to be transmitted by the second multi-disc clutch to a value greater than the second command output torque when the first rotation speed is less than the second rotation speed, and the second maximum of the torque that is able to be transmitted by the second multi-disc clutch to be equal to the second command output torque when the first rotation speed is greater than the second rotation speed, and
Expression 1 is satisfied, $$T < T_1 + T_2 \qquad \text{Expression 1}$$

where T represents the torque that is input to the input rotation member, $T_1$ represents the first maximum of a torque that is able to be transmitted by the first multi-disc clutch, and $T_2$ represents the second maximum of a torque that is able to be transmitted by the second multi-disc clutch.

2. The vehicle drive device according to claim 1, wherein the control device is configured to control the first pressing mechanism such that the first maximum of the torque that is able to be transmitted by the first multi-disc clutch is greater than the first command output torque and control the second pressing mechanism such that the second maximum of the torque that is able to be transmitted by the second multi-disc clutch is greater than the second command output torque when a rotation speed of the first output rotation member and a rotation speed of the second output rotation member are set to an identical rotation speed or are kept at an identical rotation speed.

* * * * *